Sept. 1, 1936.  F. R. FARMER  2,053,072
CIRCULATION CONTROL FOR PERCOLATORS
Filed May 4, 1931
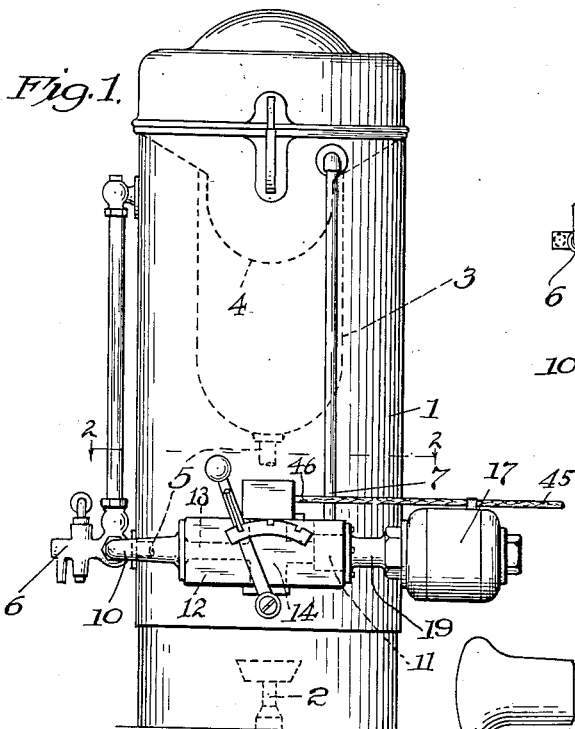
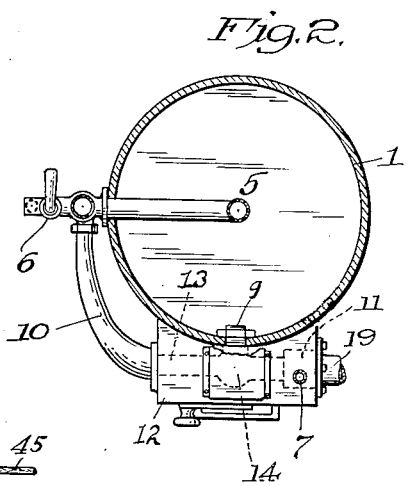
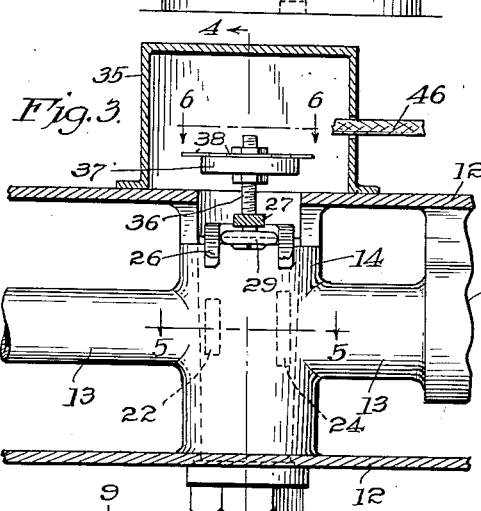
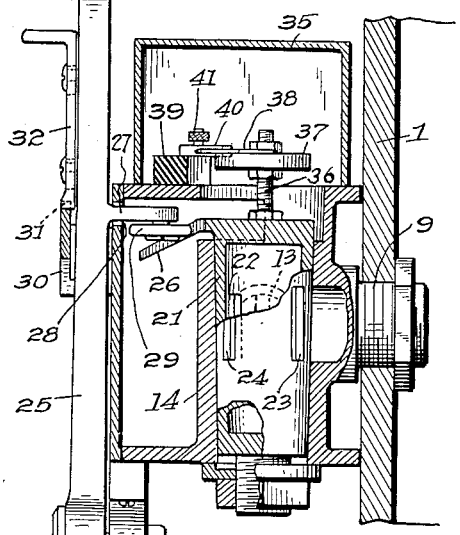
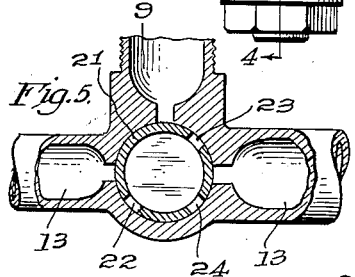
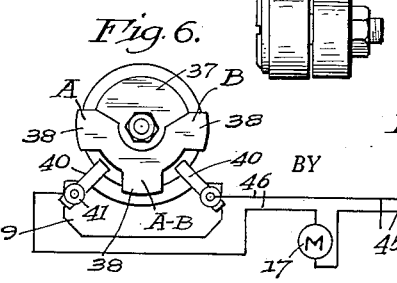
INVENTOR.
Frank R. Farmer
BY
R. W. Smith
ATTORNEY.

Patented Sept. 1, 1936

2,053,072

UNITED STATES PATENT OFFICE 2,053,072

CIRCULATION CONTROL FOR PERCOLATORS

Frank R. Farmer, Los Angeles, Calif., assignor to Farmer Bros. Co., Los Angeles, Calif., a corporation of California Application May 4, 1931, Serial No. 534,826

1 Claim. (Cl. 137—139)

This invention is a means for controlling circulation through a coffee percolator of that type adapted for initial supply and circulation of water through ground coffee to produce the desired quantity of liquid coffee, and subsequent circulation of the liquid coffee through the coffee grounds to provide the desired strength.

It is an object of the invention to provide an extremely compact and simplified control adapted for convenient operative mounting in the circulating system, and more particularly to control circulation by a single valvular means adapted for neutral positioning so as to shut-off circulation, or adapted for shifting to one or the other of operative positions which respectively provide for circulating additional water and recirculating the percolated coffee.

It is a still further object of the invention to provide conveniently accessible means for operating the valve, and to adapt its shifting for readily controlling the pumping element of the circulating system so as to stop the pump when the valve is in neutral position and start the pump when the valve is shifted to either of its operative positions.

Further objects of the invention will be readily understood from the following description of the accompanying drawing, in which:

Fig. 1 is a side elevation of a coffee percolator embodying the invention.

Fig. 2 is a horizontal section on the line 2—2 of Fig. 1.

Fig. 3 is a vertical axial section through the control mechanism.

Fig. 4 is a transverse section on the line 4—4 of Fig. 3.

Figs. 5 and 6 are detail sections on the lines 5—5 and 6—6 respectively of Fig. 3.

The invention is particularly applicable to that type of commercial coffee urn which includes an outer water chamber 1, heated by a suitable burner 2, with a receptacle 3 for liquid coffee mounted in the water chamber and supporting the usual previous container 4 for the ground coffee. A conduit 5 communicates with receptacle 3 and is provided with a usual faucet 6 for withdrawing coffee, and a conduit 7 is adapted to spray liquid into the coffee container 4, with control mechanism providing for communication of conduit 7 with either the water chamber 1 via a pipe 9, or with the conduit 5 via a pipe 10.

A pump 11 is mounted in conduit 7, and the control mechanism includes a valve so arranged that when turned to one position pipe 10 is closed to conduit 7 and pipe 9 is open to said conduit, whereby operation of the pump will draw water from chamber 1 and discharge the same through conduit 7 onto the ground coffee in container 4 so as to produce the desired quantity of liquid coffee in receptacle 3, and turning the valve to another position will close pipe 9 to the conduit 7 and open pipe 10 to said conduit, thereby cutting-off further water supply but, by means of the pump, circulating the liquid from receptacle 3 through the container 4 via conduit 7, so as to increase the strength of the coffee. When the coffee is of desired strength the valve is turned to an intermediate position closing both pipe 9 and pipe 10 to the conduit 7, so that the supply of coffee in receptacle 3 may be withdrawn at faucet 6 as desired; and the drive mechanism for the pump is preferably controlled by turning the valve, so as to stop the pump when the valve is in its inoperative intermediate position, and start the pump when the valve is in either of its operative positions opening pipe 9 or 10 to the conduit 7.

The valve of the control mechanism is adapted for convenient assembly with relation to conduit 7 and the pipes 9 and 10, and for this purpose a housing 12 at the exterior of chamber 1 preferably has a longitudinal bore 13 forming a valve casing 14 medially of its length, with pipe 10 communicating with one end of the bore 13 and pipe 9 projecting laterally from the valve casing 14 and opening into water chamber 1 and forming a supporting means for the housing. The opposite end of bore 13 forms an inlet to the casing of pump 11, and a peripheral outlet is provided in the pump casing and communicates with the conduit 7. The pump may be a centrifugal pump preferably driven on an electric motor 17, the shaft of which is shown as forming the drive shaft for the pump, with said drive shaft journaled in a housing 19 which is affixed at its respective ends to housing 12 and to the motor 17 so as to form a support for the motor.

The valve which is mounted in casing 14 is shown as a plug valve 21 rotatable in the valve casing, and having diametrically opposite ports 22—23 and a port 24 at right angles thereto, so arranged that when the valve is turned to an intermediate position as shown in Fig. 5, the valve closes both the pipe 9 and the bore 13, and when rotated in one direction alines ports 22—23 with the bore 13 so as to open pipe 10 to the pump 11 and maintain the pipe 9 closed, while rotation of the valve in the opposite direction from its neutral position alines port 23 with pipe 9 and port 24 with the end of bore 13 which leads to pump 11, thereby opening pipe 9 to the pump and at the same time shutting-off the opposite end of bore 13 which communicates with pipe 10.

The valve is preferably rotated by a lever 25 which is pivotally supported for arcuate movement across the front surface of housing 12; and for this purpose a fork 26 preferably projects laterally from the upper end of valve plug 21, with an arm 27 on lever 25 projecting into housing 12 through an arcuate slot 28, and carrying a roller 29 which seats in the fork 26 so that shifting the lever to vertical position turns valve 21 to neutral position as shown in Fig. 5, while forward shifting of the lever to the position shown in Fig. 1 opens the pipe 10 to the pump 11, and rearward shifting of the lever beyond its neutral position opens the pipe 9 to the pump. The lever 25 may be guided in its arcuate movement and releasably held in desired position, by a usual arcuate guide 30 overlying the swinging lever and notched at 31 for engagement by a manually retractable keeper 32.

An electric switch which controls the circuit for motor 17 is preferably actuated by turning the valve plug 21, so that when the valve is in its neutral closed position the switch is open for stopping the motor; and when the valve is in either of its operative positions opening the pipe 10 or the pipe 9 to the pump 11, the switch is closed, thereby starting the motor and operating the pump so as to force liquid through conduit 7 from either the coffee receptacle 3 via pipe 10, or from the water chamber 1 via pipe 9.

As an instance of this arrangement a switch casing 35 may be mounted on housing 12, with an axial pin 36 projecting upwardly from valve plug 21 into the switch casing, and a switch element carried by the pin for rotation with the valve plug and cooperation with a stationary contact element mounted in the switch casing. The rotatable switch element may comprise an insulator block 37 fixed on pin 36 for rotation therewith, with an electrical conductor projecting laterally from the insulator block and forming three circumferentially spaced contact blades 38; and the stationary contact element may comprise an insulator block 39 spaced radially beyond blades 38 and supporting circumferentially spaced spring jaw contacts 40 which are provided with usual binding posts 41.

The blades 38 are adapted for sliding contact between the pairs of spring jaws which form the contacts 40; and the parts are so arranged that with valve 21 turned to its neutral closed position, the contacts 40 lie between and are circumferentially spaced from next adjacent blades 38 as shown in Fig. 6, while turning the valve 21 to either of its open positions will engage the contacts 40 by one or the other of the pair of blades 38 which are respectively designated A—A and B—B in Fig. 6.

As diagrammatically shown in Fig. 6, electrical energy may be supplied to motor 17 by a usual cable 45 leading from a source of power, and a cable 46 forms a part of the motor circuit and leads to switch casing 35, where its wires are connected to the binding posts of the respective contacts 40, so that when blades 38 are spaced from said contacts the motor circuit is broken, and when either the blades A—A or B—B engage said contacts the motor circuit is closed.

It will thus be seen that when valve 21 is in neutral position closing both pipe 9 and pipe 10 to the conduit 7, the motor circuit is broken so as to stop the pump 11; and when the valve is turned so as to open either pipe 9 or 10 to the conduit 7, the motor circuit is closed so as to operate the pump.

The invention thus provides an extremely simple and compact arrangement whereby circulation may be controlled by shifting the lever 25 so as to stop the pump and close pipes 9 and 10 and thus provide for withdrawal of coffee from receptacle 3 at the faucet 6, or the lever may be shifted so as to start the pump and open either pipe 9 or 10 to the conduit 7, thereby supplying water to the ground coffee in container 4 as long as pipe 9 remains open, and thereafter shutting-off the water supply and recirculating the liquid coffee from receptacle 3 until its percolation through container 4 has produced coffee of the desired strength.

I claim:

In combination, a valve casing, a rotatable plug valve in the casing, a laterally projecting fork on the plug, an extension of the casing enclosing the fork, a lever, means for pivoting the lever on the exterior of the casing extension, the casing extension having an opening, and a projection on the lever extending through the opening into the casing extension and seating in the fork for rotating the plug by swinging the lever.

FRANK R. FARMER.